US011451516B1

(12) United States Patent
Venkataramani

(10) Patent No.: US 11,451,516 B1
(45) Date of Patent: Sep. 20, 2022

(54) DEVICE ISOLATION SERVICE

(71) Applicant: Amazon Technologies, Inc., Seattle, WA (US)

(72) Inventor: Eknath Venkataramani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 503 days.

(21) Appl. No.: 16/364,029

(22) Filed: Mar. 25, 2019

(51) Int. Cl.
*H04L 29/00* (2006.01)
*H04L 9/40* (2022.01)
*H04W 12/50* (2021.01)
*H04W 12/086* (2021.01)

(52) U.S. Cl.
CPC ...... *H04L 63/0272* (2013.01); *H04L 63/0236* (2013.01); *H04L 63/10* (2013.01); *H04L 63/1408* (2013.01); *H04L 63/20* (2013.01); *H04W 12/086* (2021.01); *H04W 12/50* (2021.01)

(58) Field of Classification Search
CPC . H04L 63/0272; H04L 63/20; H04L 63/1408; H04L 63/0236; H04L 63/10; H04L 12/4641; H04W 12/086; H04W 12/50
See application file for complete search history.

(56) References Cited

U.S. PATENT DOCUMENTS

| 2003/0191937 | A1* | 10/2003 | Balissat | H04L 63/065 713/163 |
| 2016/0105424 | A1* | 4/2016 | Logue | H04L 67/20 726/7 |
| 2016/0381030 | A1* | 12/2016 | Chillappa | H04W 4/70 726/11 |
| 2018/0109495 | A1* | 4/2018 | Vasseur | H04L 63/1425 |
| 2019/0207948 | A1* | 7/2019 | Mallis | H04L 63/20 |
| 2019/0394061 | A1* | 12/2019 | Chen | H04L 67/125 |

OTHER PUBLICATIONS

Dunning, David, "What is AP Isolation?", Techwalla, published Sep. 19, 2018; https://www.techwalla.com/articles/what-is-ap-isolation.

(Continued)

*Primary Examiner* — Jeffrey C Pwu
*Assistant Examiner* — Helai Salehi
(74) *Attorney, Agent, or Firm* — Knobbe Martens Olson & Bear LLP

(57) ABSTRACT

Systems and methods are described for implementing a device isolation service. A device isolation service creates and administers per-device virtual networks for individual computing devices, thereby isolating the computing devices from each other and limiting device-to-device communication. The device isolation service may further provide a monitored and access-controlled network that facilitates access to the isolated devices, thereby allowing "administrator" devices to access and administer devices while preventing a compromised device from seeing, probing, or compromising other devices on the network. The device isolation service may group devices by category or function, and may put devices that communicate with each other on the same virtual network while isolating other devices to different virtual networks.

24 Claims, 10 Drawing Sheets

(56) References Cited

OTHER PUBLICATIONS

Hoffman, Chris, "Lock Down Your Wi-Fi Network With Your Router's Wireless Isolation Option," How-To Geek, published Jul. 10, 2017; https://www.howtogeek.com/179089/lock-down-your-wi-fi-network-with-your-routers-wireless-isolation-option/.

"Complete AP Isolate Guide," Router Guide, published Nov. 7, 2014; https://routerguide.net/complete-ap-isolate-guide-how-to-improve-your-wireless-network/.

* cited by examiner

DEVICE ISOLATION SERVICE

BACKGROUND

Generally described, computing devices can utilize a communication network, or a series of communication networks, to exchange information. In a common application, a computing device can request information from another computing device or devices via a communication network. For example, a user of a personal computing device can utilize a software application process, typically referred to as an "app" or a "browser," to request information via the Internet that is made available by a server computing device or devices. In such embodiments, the personal computing device can be referred to as a client computing device or a mobile computing device.

In some environments, computing devices that communicate via the communication network can correspond to devices having a primary function as a computing device, such as a desktop personal computer. In other environments, at least some portion of the computing devices that exchange information via the communication network can correspond to embedded devices or thin devices that have at least one alternative primary function, such as household appliances having a separate primary purpose (e.g., a thermostat or refrigerator) while also providing at least limited computing functionality. Such devices may typically be referred to as "Internet of Things" or "IoT" devices. In some instances, IoT devices may have limited capabilities relative to devices that primarily function as computing devices.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
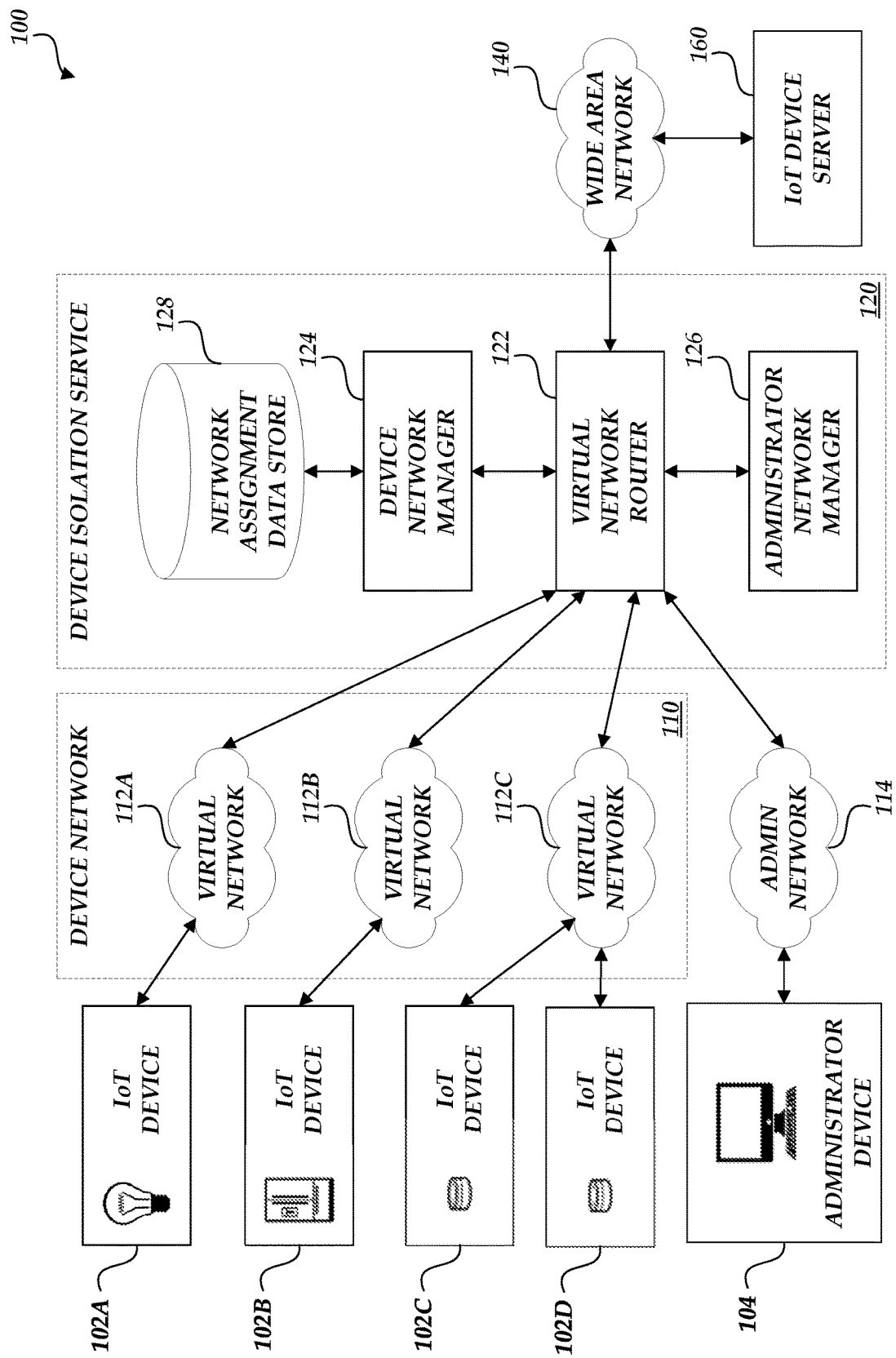
FIG. 1 is a block diagram depicting an illustrative environment in which computing devices are isolated to device-specific virtual networks by a device isolation service in accordance with aspects of the present disclosure.

Generally described, aspects of the present disclosure relate to managing the transmission of data in communication networks. More specifically, aspects of the present disclosure are directed to systems, methods, and computer-readable media related to managing the transmission of data in a communication network by isolating individual devices according to individual virtual networks. Illustratively, one or more aspects of the present application may be embodied in communication networks including one or more computing devices, referred to as IoT devices, that are characterized as having limited capabilities relative to general purpose computing devices. For example, an IoT device may have more limited communication functionality, and thus may not support various functions for securing communication that can be implemented by other devices. The operating system and application may be stored in firmware or read-only memory, and thus may be difficult to update with, e.g., security patches or bug fixes. The IoT device may further be limited in terms of processing power, memory, storage capacity, and the like, such that the device's ability to implement security mechanisms may be constrained even if the device is capable of implementing them.

In the context of communication networks, a single network, such as a home network or a corporate network, may include a number of computing devices that communicate with each other over the network and communicate to devices on other networks through a routing device. In some situations, a communication network can include a plurality of IoT devices, which may be configured to operate individually or according to some grouping/clustering (e.g., a plurality of lighting devices controllable via a network connection). As described above, one or more computing devices, especially limited functionality IoT devices, may have more limited application and communication functionality, especially with regard to security or other protective mechanisms related to network-based vulnerabilities. For example, other devices accessing the communication network may be able to access an IoT device and exploit the device in an unauthorized manner. In another example, a computing device may unintentionally influence the functionality of limited functionality devices, such as IoT devices, based on faults or bugs in the computing device (e.g., a computing device that unintentionally generates a great deal of network traffic that could make the operation of the IoT device less efficient or perhaps even interrupt the operation of an IoT device).

To address these issues, at least in part, a communication network can be implemented with a device isolation service for isolating communications for a plurality of computing devices. As described in detail herein, a device isolation service may manage communications between devices on a network, such as a wireless communication network, by assigning individual devices to isolated virtual networks established by a routing device. The device isolation service may limit access to individual devices on each respective virtual network, such that the devices may only be accessed through a secured administrator network. Individual devices, such as IoT devices, may thus initiate outbound communications to external networks (e.g., to "phone home" or otherwise communicate with a server via the Internet) via the virtual network provided by a routing device. However, devices within the established network may be limited or prohibited from device-to-device interaction/communication.

In various embodiments, a device isolation service may assign individual devices that generate network traffic to singular virtual networks, such as in a one device per virtual network allocation. In other embodiments, the device isolation service may assign two or more devices to a specified virtual network based on criteria such as the type or category of device, the network traffic generated by the device, or other criteria. For example, the device isolation service may establish a single virtual network associated with multiple "smart speakers" or other virtual assistant devices, as these devices may need to communicate with each other to coordinate responses to voice input (e.g., so that a user query such as "Alexa, what time is it?" is answered by a single device and not by all devices within audio range). Accordingly, in some embodiments, the device isolation service may identify a category of devices and assign them to a common virtual network in order to permit device-to-device communications between those devices only. Categories of devices may include, for example, security devices, virtual assistant devices, lighting devices, content presentation devices, home appliances, and other such categories.

In some embodiments, the device isolation service may identify a device or a category of devices based on the identities of servers that the devices attempt to contact when connected to a network. For example, the device isolation service may determine that a family of devices are all communicating to a common server or set of servers associated with a specified network address or block of addresses (e.g., at least some portion of overlapping network address information). The device isolation service may be further configured to process the network address information, such as a whitelist or blacklist, to identify network address information that may specified to be combinable. For example, a network address or server may be associated with a home security system, and the device isolation service can be configured to allow for all devices communicating with the server to be associated with a common virtual network.

In further embodiments, the device isolation service may use additional criteria to facilitate identifying and processing device categories. For example, the device isolation service may determine that a device is streaming video over the network, and on this basis may determine that the device is a network-enabled video camera. The device isolation service may further determine that the devices in a "video camera" category do not need to communicate with each other, and may thus be assigned to individual virtual networks. The device isolation service may determine that other categories include devices that engage in device-to-device communication and should thus be assigned to a common virtual network. In further embodiments, the device isolation service may analyze network traffic to identify patterns or trends, such as a network-enabled thermostat that periodically checks whether there are any other network-enabled thermostats on the same network. In some embodiments, the device isolation service may alert a user if a device deviates from a pattern of network activity. For example, if a network-enabled light bulb had not previously attempted any device-to-device communication but suddenly begins scanning the network for other devices, the device isolation service may alert the user to the possibility that the device has been compromised. In some embodiments, the device isolation service may compare a device to similar devices to identify network activity that is atypical for that type or category of device. The device isolation service may thereby detect a device that is introduced to the network in a compromised or misconfigured state even if the device establishes a pattern of consistent (bad) behavior. For example, the device isolation service may determine that a new device is a home security camera (or is presenting itself as one). The device isolation service may thus recognize that devices in this category typically generate network traffic in the form of streaming video, and may alert the user that the new device is not generating streaming video or is generating network traffic (e.g., communications with unknown servers) that other home security cameras are not generating. The device isolation service may further recognize certain types of network activity (e.g., BitTorrent, traffic related to bitcoin mining, etc.) as inherently atypical, and may alert a user if a device engages in these network activities. Additionally, in some embodiments, the device isolation service may throttle, firewall, or otherwise limit traffic to or from a particular device or a particular virtual network. For example, the device isolation service may determine that a network-enabled refrigerator only generates a small amount of traffic to a particular server, and may generate an alert or block communications if the refrigerator unexpectedly begins communicating with other servers or taking up high amounts of bandwidth.

In some embodiments, a computing device may be configured to control or perform administrative functions for the IoT devices. For example, a "hub" device may interface with network-enabled light bulbs to manage bulb settings, or an application on a mobile computing device may allow a user to set the temperature on a network-enabled thermostat. Such devices may be referred to herein as "administrator devices." The device isolation service may assign such devices to an administrator network, and may allow devices on the administrator network to access associated devices on a number of established virtual networks. For example, the device isolation service can facilitate administrator access via access control lists or network translations. In some embodiments, access to the administrator network may be secured, such that a device must provide a login and password, authentication token, or satisfy other criteria before being admitted to the administrator network. For example, the administrator network may be implemented as a Wi-Fi® network having a separate SSID from the device network, and may be secured using the WPA2 protocol. In some embodiments, the device isolation service may recognize devices that perform administrative functions for IoT devices (e.g., home automation "hub" devices) and automatically assign them to the administrator network.

The device isolation service may, in some embodiments, implement criteria that devices must satisfy in order to access or remain on the administrator network. For example, the device isolation service may specify that devices may remain on the administrator network for no more than a specified amount of time (e.g., ten minutes, one hour, etc.), or that devices which have been idle for a specified amount of time will be removed. In some embodiments, the device isolation service may detect atypical patterns of administrator device behavior, such as a "hub" for network-enabled light bulbs that begins trying to communicate with other appliances, or may detect potentially malicious behavior (e.g., port scanning or host discovery), and may alert the user or block such activity.

It will be understood that the device isolation service described herein addresses a technical problem that specifically arises in the realm of computer networks, and in particular addresses a problem that arises in the realm of computer network security. It will further be understood that the technical problem described herein is not analogous to any pre-Internet practice, and that the device isolation service improves the performance of computer networks by mitigating the impact of misbehaving or compromised devices on the performance of other devices on the same network. The embodiments disclosed herein thus represent an improvement on existing computer networks and computing systems in general. It will further be understood that, although example embodiments are described herein with reference to IoT devices, the present disclosure is not limited to IoT devices and aspects of the present disclosure are applicable to any computing device.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an illustrative operating environment 100 in which a number of IoT devices 102A-D communicate with a device isolation service 120 via a device network 110 and a number of virtual networks 112A-C. The illustrative operating environment 100 further includes an administrator device 104, which communicates with the device isolation service 120 via an administrator network 114, and still further includes an IoT device server 160, which communicates with the device isolation service 120 via a wide area network 140.

The IoT devices 102A-D are described in more detail below with reference to FIGS. 2B and 2C, and may illustratively be any devices that implement aspects of the present disclosure such as communicating with other computing devices via a network. In the illustrated embodiment, device 102A is a network-enabled light bulb, device 102B is a network-enabled refrigerator, and devices 102C and 102D are "smart speakers" that process voice input and provide a virtual assistant service and audio content playback. In other embodiments, devices 102A-D include, for example, network-enabled home appliances, security systems, doorbells, thermostats, media consumption devices (e.g., televisions, stereos, etc.), environmental sensors (e.g., smoke detectors, carbon monoxide detectors, leak detectors, humidity or temperature gauges, etc.), sprinkler systems, electrical outlets, and the like. In some embodiments, devices 102A-D may include wearable computing devices, tablet computing devices, personal computing devices, mobile computing devices, and the like. While example embodiments herein refer to devices as "IoT devices," it will be understood that the scope of the present disclosure includes any device that is network-enabled.

The administrator device 104 may illustratively be any device that implements aspects of the present disclosure such as communicating with the IoT devices 102A-D to provide administrative functions. Examples of an administrator device 104 may include devices such as a "smart home" network hub, security system alarm panel, mobile computing device, tablet computing device, personal computing device, wearable computing device, or other device that submits authenticated requests for access to the IoT devices 102A-D.

The operating environment 100 further includes a device network 110. The device network 110 may illustratively be any wired or wireless network, or combination thereof. In addition, the device network 110 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the device network 110 may be a private or semi-private network, such as a corporate or university intranet. The device network 110 may include one or more wireless networks, such as a Global System for Mobile Communications (GSM) network, a Code Division Multiple Access (CDMA) network, a Long Term Evolution (LTE) network, or some other type of wireless network. The device network 110 may use protocols and components for communicating via the Internet or any of the other aforementioned types of networks.

The device network 110 includes a number of virtual networks 112A-C that are associated with individual IoT devices 102A-D or groups of IoT devices 102A-D. For example, in the illustrated embodiment, IoT device 102A is assigned to virtual network 112A, IoT device 102B is assigned to virtual network 112B, and IoT devices 102C and 102D are assigned to virtual network 112C. The virtual networks 112A-C may be created and the IoT devices 102A-D may be assigned to virtual networks 112A-C by a device isolation service 120, as described in more detail below.

The operating environment 100 further includes an administrator network 114. Like the device network 110, the administrator network 114 may illustratively be any wired or wireless network, or combination thereof. In addition, the administrator network 114 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the administrator network 114 may be a private or semi-private network, such as a corporate or university intranet. The administrator network 114 may include one or more wireless networks, such as a Global System for Mobile Communications (GSM) network, a Code Division Multiple Access (CDMA) network, a Long Term Evolution (LTE) network, or some other type of wireless network. The administrator network 114 may use protocols and components for communicating via the Internet or any of the other aforementioned types of networks.

The operating environment 100 further includes a device isolation service 120, which is described in more detail with reference to FIG. 2A below. In the illustrated embodiments, the device isolation service 120 includes a virtual network router 122, a device network manager 124, and an administrator network manager 126, which implement various aspects of the present disclosure as described in more detail with regard to FIGS. 3A-3D below. The device isolation service 120 further includes a network assignment data store 128, which may illustratively be any non-transient computer-readable data store including magnetic media, optical media, solid state devices, flash memories, EEPROMs, or other storage media. In various embodiments, the network assignment data store 128 may be implemented as a database, a database server, a component of another server or service, or may include or be embodied in a data storage web service. In some embodiments, all or part of the device isolation service 120 may be implemented by or as a component of a network router, firewall, switch, hub, or other networking device.

The virtual network router 122 may communicate with other computing devices, such as an IoT device server 160, via a wide area network 140. The IoT device server 160 may illustratively be any server or computing device that communicates with IoT devices 102A-D via the network 140. For example, the IoT device server 160 may receive and store video from a network-equipped security camera, receive and process audio to recognize speech (or respond to voice commands) as part of implementing a virtual assistant service, or provide other services utilized by IoT devices 102A-D. Like the device network 110 and the administrator network 114, the wide area network 140 may illustratively by any wired or wireless network, or combination thereof. In addition, the wide area network 140 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the wide area network 140 may be a private or semi-private network, such as a corporate or university intranet. The wide area network 140 may include one or more wireless networks, such as a Global System for Mobile Communications (GSM) network, a Code Division Multiple Access (CDMA) network, a Long Term Evolution (LTE) network, or some other type of wireless network. The wide area network 140 may use protocols and components for communicating via the Internet or any of the other aforementioned types of networks.

It will be understood that the operating environment 100 may include more (or fewer) elements than those shown in FIG. 1. It is not necessary, however, that all of these elements be shown in order to provide an enabling disclosure.

Figure 2A:
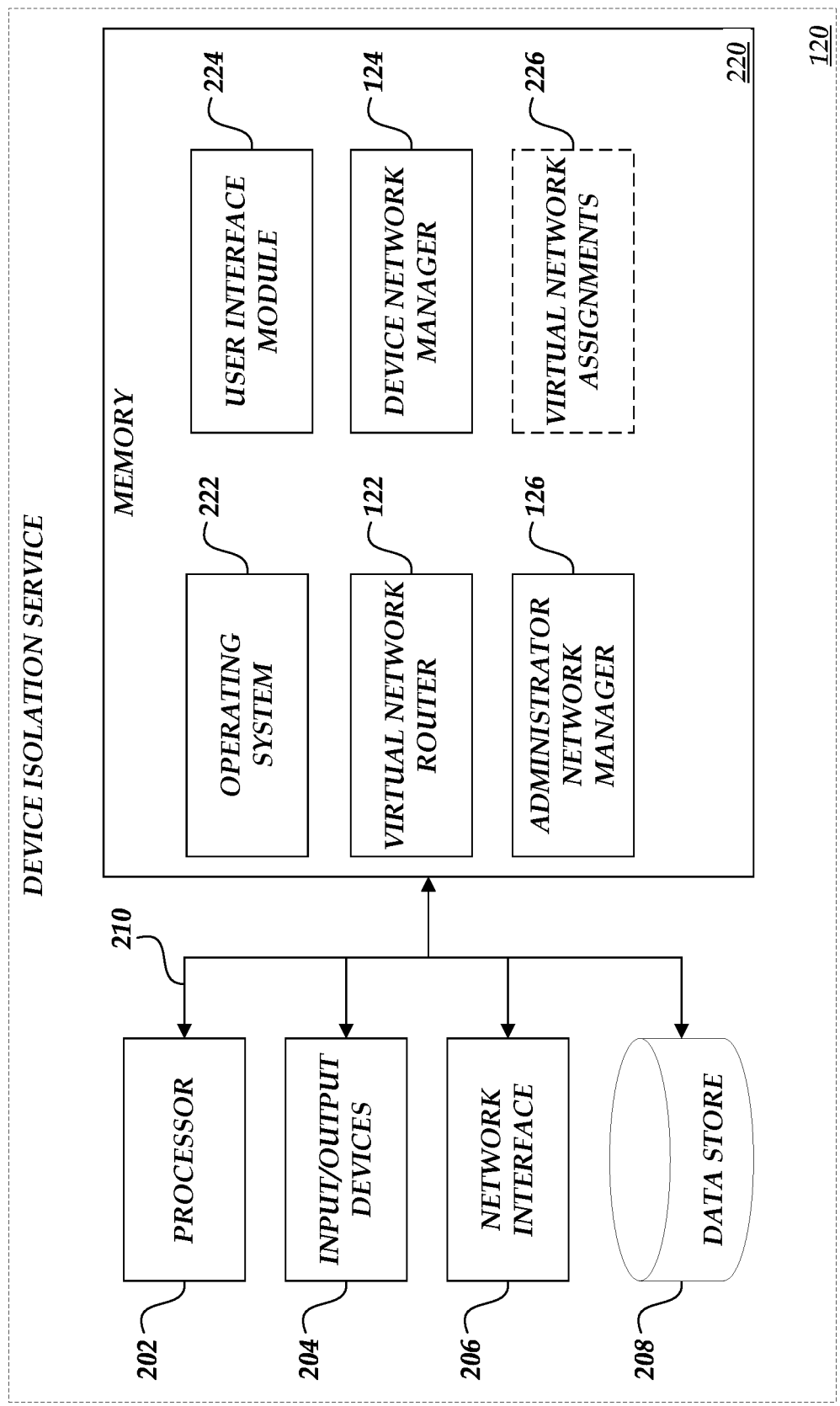
FIG. 2A depicts a general architecture of a computing device implementing a device isolation service as depicted in FIG. 1.

FIG. 2A depicts a general architecture of the device isolation service 120, which includes an arrangement of computer hardware and software configured to implement aspects of the present disclosure. The device isolation service 120 may include many more (or fewer) elements than those shown in FIG. 2A. It is not necessary, however, that all of these elements be shown in order to provide an enabling disclosure.

As illustrated, the device isolation service 120 includes a processor 202, input/output devices 204, a network interface 206, and a data store 208, all of which may communicate with one another by way of a communication bus 210. The network interface 206 may provide connectivity to one or more networks (such as the device network 110, the administrator network 114, and the wide area network 140 depicted in FIG. 1) or computing systems and, as a result, may enable the device isolation service 120 to receive and send information and instructions from and to other computing systems or services, such as the IoT devices 102A-D or the administrator device 104 depicted in FIG. 1. In some embodiments, the device isolation service 120 may be configured to process requests from the IoT devices 102A-D or the administrator device 104, such as requests to initiate network communications. The data store 208 may illustratively be any non-transient computer-readable data store, and in some embodiments may include all or part of the network assignment data store 128 depicted in FIG. 1.

The processor 202 may also communicate to and from a memory 220. The memory 220 may contain computer program instructions (grouped as modules or components in some embodiments) that the processor 202 may execute in order to implement one or more embodiments. The memory 220 generally includes RAM, ROM, and/or other persistent, auxiliary, or non-transitory computer-readable media. The memory 220 may store an operating system 222 that provides computer program instructions for use by the processor 202 in the general administration and operation of the device isolation service 120. The memory 220 may further store specific computer-executable instructions and other information (which may be referred to herein as "modules" or "engines") for implementing aspects of the present disclosure. For example, the memory 220 may include a user interface module 224, which in some embodiments may implement, e.g., user interfaces that enable manual assignment or reassignment of devices to virtual networks. The memory 220 may further include the virtual network router 122, which may implement aspects of the present disclosure such as routing network communications to and from devices on virtual networks. The memory 220 may further include the device network manager 124, which may implement aspects of the present disclosure such as carrying out the device virtual network assignment routine 400 depicted in FIG. 4. The memory may still further include the administrator network manager 126, which may implement aspects of the present disclosure such as carrying out the administrator network assignment routine 500 depicted in FIG. 5.

The memory 220 may further include virtual network assignments 226, which may be loaded into the memory 220 as various operations are performed or may be generated by the performance of these operations. In some embodiments, the virtual network assignments 226 may be obtained from internal or external data stores (such as the network assignment data store 128 of FIG. 1), either directly or via a network (e.g., administrator network 114).

While the operating system 222, user interface module 224, virtual network router 122, device network manager 124, and administrator network manager 126 are illustrated as distinct modules in the memory 220, in some embodiments, one or more of the user interface module 224, virtual network router 122, device network manager 124, and administrator network manager 126 may be incorporated as a module in the operating system 222 or another application or module, and as such, separate modules may not be required to implement some embodiments.

It will be recognized that many of the components described in FIG. 2A are optional and that embodiments of the device isolation service 120 may or may not combine components. Furthermore, components need not be distinct or discrete. Components may also be reorganized. For example, the device isolation service 120 may be represented in a single physical device or, alternatively, may be split into multiple physical devices. In some embodiments, components illustrated as part of the device isolation service 120 may additionally or alternatively be included in other computing devices (such as the administrator computing device 104 of FIG. 1), such that some aspects of the present disclosure may be performed by the device isolation service 120 while other aspects are performed by another computing device.

Figure 2B:
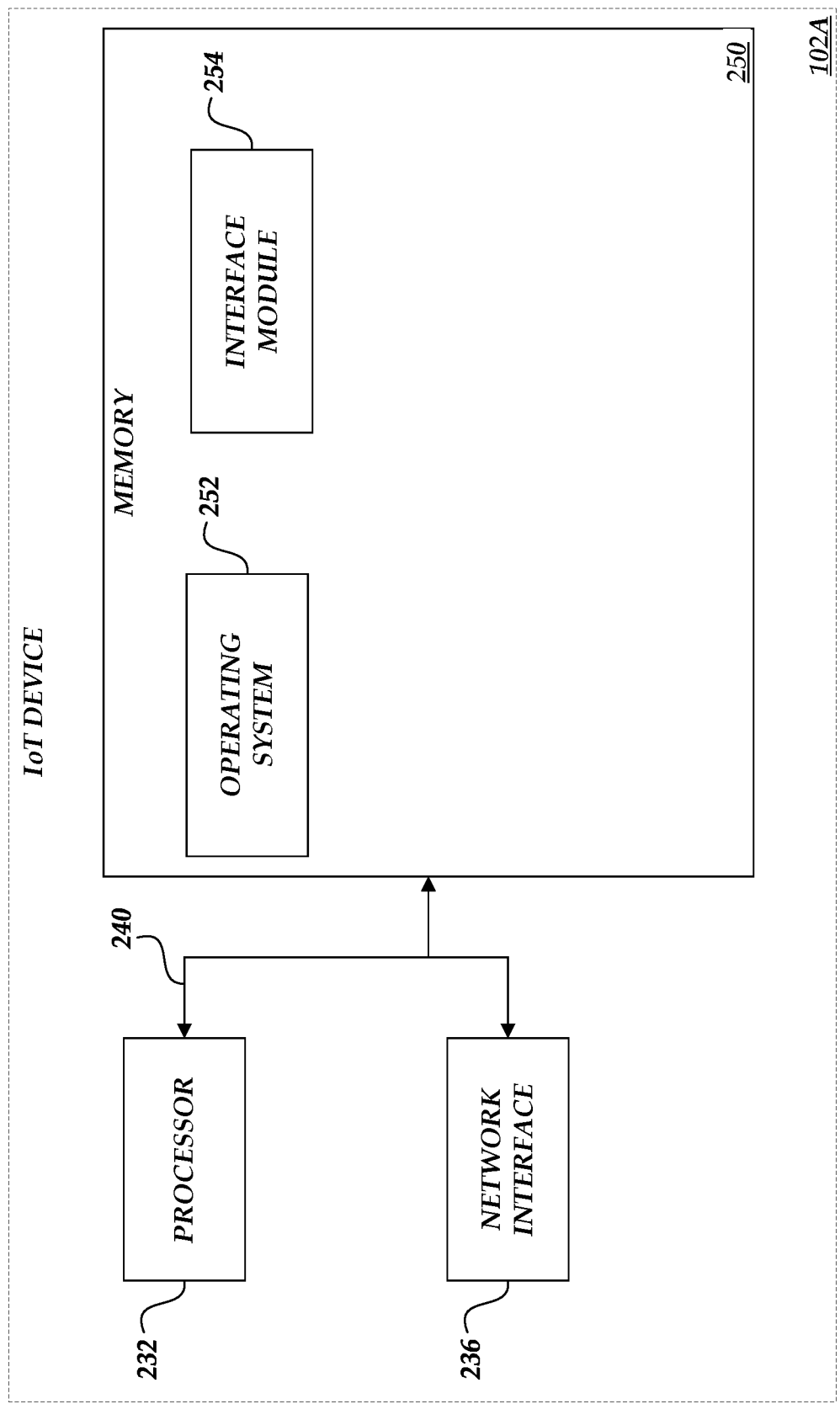
FIG. 2B depicts a general architecture of an IoT device having limited functionality.

FIG. 2B depicts a general architecture of an IoT device 102A with limited functionality, which includes an arrangement of computer hardware and software configured to implement aspects of the present disclosure. The IoT device 102A may include many more (or fewer) elements than those shown in FIG. 2B. It is not necessary, however, that all of these elements be shown in order to provide an enabling disclosure.

As illustrated, the IoT device 102A includes a processor 232 and a network interface 236, which may communicate with one another by way of a communication bus 240. The network interface 236 may provide connectivity to one or more networks (such as the device network 110, the administrator network 114, and the wide area network 140 depicted in FIG. 1) or computing systems and, as a result, may enable the IoT device 102A to receive and send information and instructions from and to other computing systems or services, such as the device isolation service 120 depicted in FIG. 1. In some embodiments, the IoT device 102A may be configured to process instructions from the device isolation service 120, such as instructions to join a particular virtual network.

The processor 232 may also communicate to and from a memory 250. The memory 250 may contain computer program instructions (grouped as modules or components in some embodiments) that the processor 232 may execute in order to implement one or more embodiments. The memory 250 generally includes RAM, ROM, and/or other persistent, auxiliary, or non-transitory computer-readable media. The memory 250 may store an operating system 252 that provides computer program instructions for use by the processor 232 in the general administration and operation of the IoT device 102A. The memory 250 may further store specific computer-executable instructions and other information (which may be referred to herein as "modules" or "engines") for implementing aspects of the present disclosure. For example, the memory 250 may include an interface module 254, which in some embodiments may implement, e.g., network communications via the network interface 236. In some embodiments, the interface module 254 may be incorporated as a module in the operating system 252 or another application or module, and as such, a separate module may not be required to implement some embodiments.

Figure 2C:
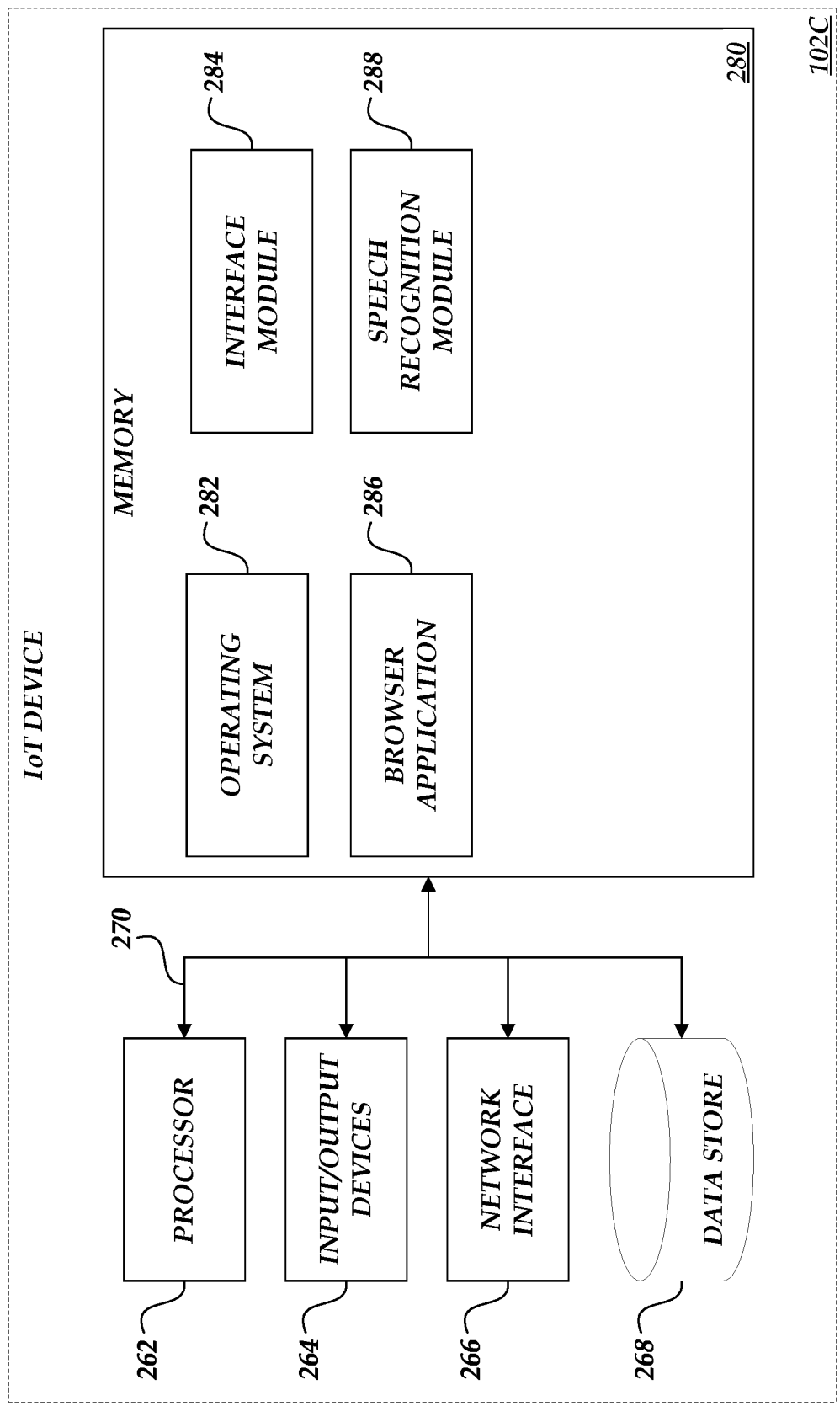
FIG. 2C depicts a general architecture of a more complex IoT device.

FIG. 2C depicts a general architecture of a more complex IoT device 102C, which includes an arrangement of computer hardware and software configured to implement aspects of the present disclosure. The IoT device 102C may include many more (or fewer) elements than those shown in FIG. 2C, including elements that are not included in IoT devices having more limited functionality (e.g., the IoT device 102A depicted in FIG. 2B). It is not necessary, however, that all of these elements be shown in order to provide an enabling disclosure.

As illustrated, the IoT device 102C includes a processor 262, input/output devices 264, a network interface 266, and a data store 268, all of which may communicate with one another by way of a communication bus 270. The network interface 266 may provide connectivity to one or more networks (such as the device network 110, the administrator network 114, and the wide area network 140 depicted in FIG. 1) or computing systems and, as a result, may enable the IoT device 102C to receive and send information and instructions from and to other computing systems or services, such as other IoT devices 102A, 102B, and 102D or the administrator device 104 depicted in FIG. 1. In some embodiments, the IoT device 102C may be configured to process instructions from the device isolation service 120, such as instructions to join a particular virtual network. The data store 268 may illustratively be any non-transient computer-readable data store.

The processor 262 may also communicate to and from a memory 280. The memory 280 may contain computer program instructions (grouped as modules or components in some embodiments) that the processor 262 may execute in order to implement one or more embodiments. The memory 280 generally includes RAM, ROM, and/or other persistent, auxiliary, or non-transitory computer-readable media. The memory 280 may store an operating system 282 that provides computer program instructions for use by the processor 262 in the general administration and operation of the IoT device 102C. The memory 280 may further store specific computer-executable instructions and other information (which may be referred to herein as "modules" or "engines") for implementing aspects of the present disclosure. For example, the memory 280 may include a user interface module 284, which in some embodiments may implement, e.g., interfaces with other IoT devices (e.g., IoT device 102D). In some embodiments, the memory 280 may include other modules such as, e.g., a browser application 286 for accessing content on other devices. Illustratively, the browser application 286 may encompass a full software browser application, portions of a browser application, or simply be an interface software application (or executable instructions) that provide for data connectivity. In some embodiments, the memory 280 may further include a speech recognition module 288 or other modules that implement the functionality provided by the IoT device 102C.

While the operating system 282, interface module 284, browser application 286, and speech recognition module 288 are illustrated as distinct modules in the memory 280, in some embodiments, one or more of the interface module 284, browser application 286, and speech recognition module 288 may be incorporated as a module in the operating system 228 or another application or module, and as such, separate modules may not be required to implement some embodiments.

It will be recognized that many of the components described in FIGS. 2B and 2C are optional and that embodiments of the IoT devices 102A and 102C may or may not combine components. Furthermore, components need not be distinct or discrete. Components may also be reorganized. For example, the IoT device 102A or 102C may be represented in a single physical device or, alternatively, may be split into multiple physical devices. In some embodiments, components illustrated as part of the IoT device 102A or 102C may additionally or alternatively be included in other computing devices (such as the administrator computing device 104 of FIG. 1), such that some aspects of the present disclosure may be performed by the IoT device 102A or 102C while other aspects are performed by another computing device.

Figure 3A:
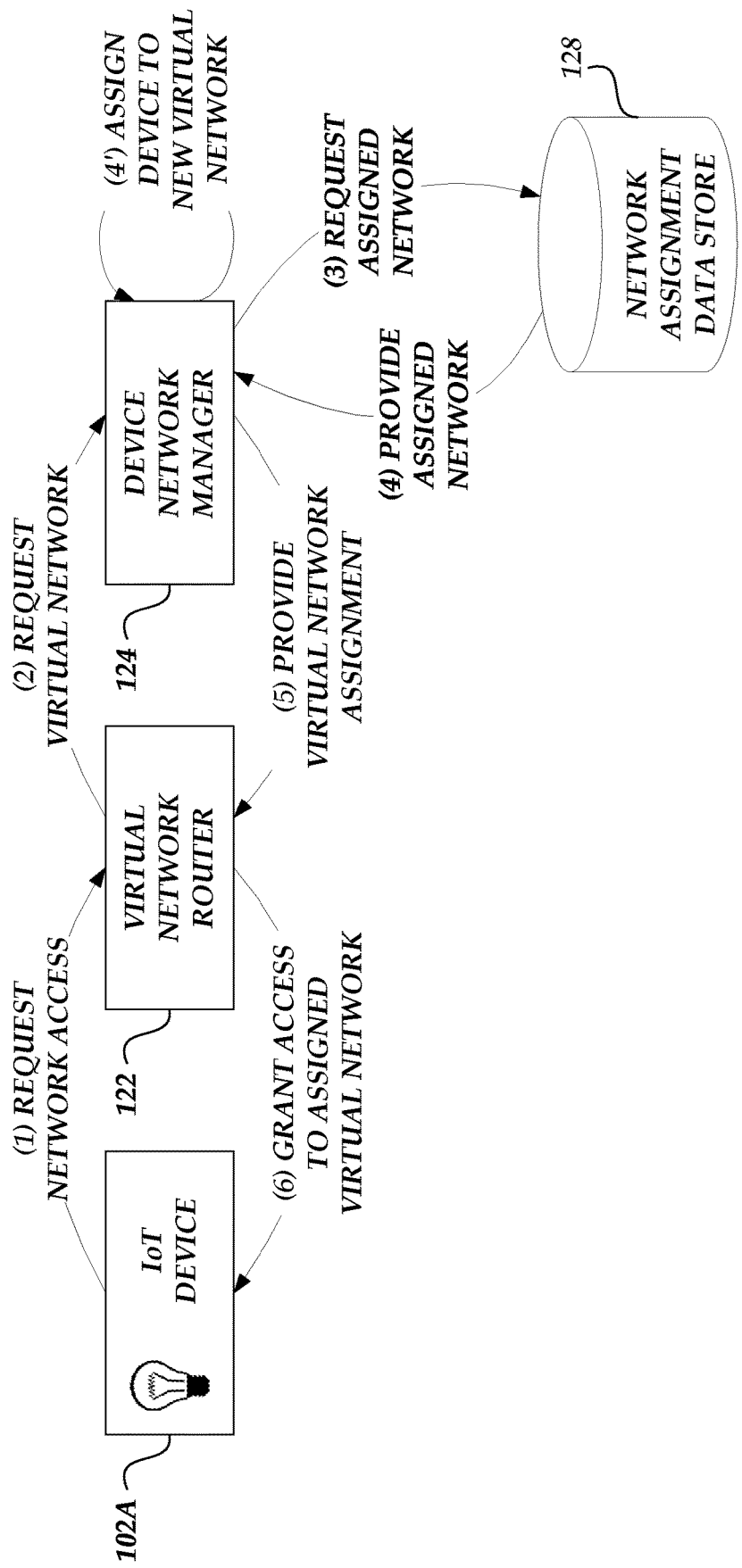
FIG. 3A is a flow diagram depicting illustrative interactions for using a device isolation service to assign a device to a device-specific virtual network in accordance with aspects of the present disclosure.

FIG. 3A depicts example interactions for assigning devices to virtual networks in accordance with aspects of the present disclosure. At (1), a device (which, in the illustrated embodiment, is IoT device 102A) may request network access. In various embodiments, the device 102 a may request network access by joining a network, transmitting a packet or packets over a network, communicating with a router, issuing a "ping" or heartbeat, or otherwise initiating network-based communication.

At (2), the virtual network router 122 may request that the device network manager 124 identify or provide a virtual network for the IoT device 102A. In some embodiments, the virtual network router 122 may determine that the IoT device 102 is joining the network for the first time (e.g., because it has never seen the IoT device 102 before), and may request that the device network manager 124 generate a virtual network. At (3), the device network manager 124 queries the network assignment data store 128 to determine whether an existing virtual network has been assigned to the IoT device. In some embodiments, as described above, the device network manager 124 may identify a category of device that is associated with the IoT device 102A, and may query the network assignment data store 128 four a virtual network associated with that category. In other embodiments, the device network manager 124 may apply rules or other criteria to determine whether the IoT device 102A should be assigned to a newly created virtual network or an existing virtual network.

At (4), in some embodiments, the network assignment data store 128 provides information identifying a virtual network to which the IoT device 102A has been (or should be) assigned. In other embodiments, the network assignment data store 128 reports that the IoT device 102A has not previously been assigned to a virtual network and that none of the existing virtual networks are associated with a category of the IoT device 102A. In these embodiments, at (4'), the device network manager 124 generates a new virtual network and assigns the IoT device 102A to that network. At (5), the device network manager 124 provides the virtual network assignment to the virtual network router 122.

At (6), virtual network router 122 instructs the IoT device 102A to join the assigned virtual network. Illustratively, the device network manager 124 may create and assign the virtual network 112A depicted in FIG. 1, and the virtual network router 122 may instruct the IoT device 102A to join the virtual network 112A. In some embodiments, the virtual network may be a virtual LAN ("VLAN") implemented according to the IEEE 802.1Q standard, and network traffic associated with the IoT device 102A may be tagged with a particular VLAN tag.

In further embodiments, the virtual network may be defined as an Internet Protocol version 4 ("IPv4") subnet having a 32-bit mask, such as 10.0.0.1/32, which defines a network having a single addressable device (i.e., the device at IP address 10.0.0.1). The device network manager 124 may be configured to adjust such a subnet mask as devices are added, so that there is only space in the subnet mask to accommodate the number of devices that exist within a group. The IoT device 102A may then communicate with other networks via the virtual network router 122, which (as depicted in FIG. 1) may allow the IoT device 102A to interact with, e.g., an IoT device server 160. However, the IoT device 102A is effectively isolated from other devices served by the virtual network router 122 by virtue of being on a separate virtual network, and the IoT device 102A cannot "see" or communicate with other devices on other virtual networks (e.g., IoT devices 102B-D on virtual networks 112B and 112C).

In some embodiments, as described above, the virtual network router 122 may monitor network traffic generated by the IoT device 102A. Illustratively, the virtual network router 122 may identify atypical network traffic generated by the IoT device 102A, and may respond to the atypical network traffic by generating an alert, blocking the traffic, further isolating the IoT device 102A (e.g., putting it on a separate virtual network from other devices) or removing the IoT device 102A from the network entirely. For example, the virtual network router 122 may monitor the IoT device 102A over time, and may thereby determine that it routinely communicates with a particular server, and that it typically generates a certain volume of network traffic. If the IoT device 102A then begins communicating with other servers, changes the volume of traffic it generates, or otherwise deviates from the established pattern, then virtual network router 122 or the device network manager 124 may determine that the device is behaving atypically. In some embodiments, the virtual network router 122 may obtain or develop device profiles for different types of devices. For example, the virtual network router 122 may obtain a device profile for a network-enabled washer and dryer. The device profile may indicate that the network-enabled washer and dryer typically communicate with each other, and that they periodically communicate with a remote server at a particular domain (e.g., "http://smartappliances.example.com") to obtain software updates and the like. The virtual network router 122 may thus identify as atypical any communication between the network-enabled washer and dryer and other servers or devices. In other embodiments, the virtual network router 122 may build a device profile for a particular device or category of devices based on the network traffic it monitors, and may determine over time that, e.g., virtual assistant devices from a particular manufacturer typically communicate with that manufacturer's remote servers to process voice commands.

Figure 3B:
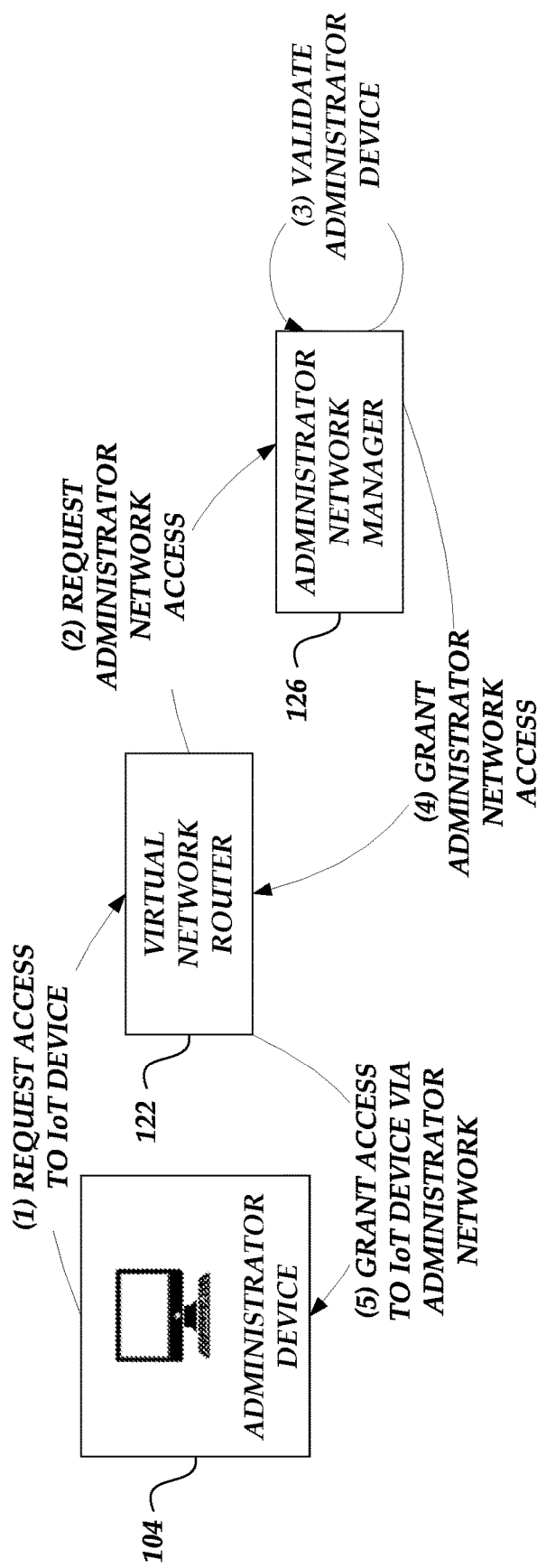
FIGS. 3B, 3C, and 3D are flow diagrams depicting illustrative interactions for using a device isolation service to access isolated devices from an administrator device, in accordance with aspects of the present disclosure.
Figure 3C:
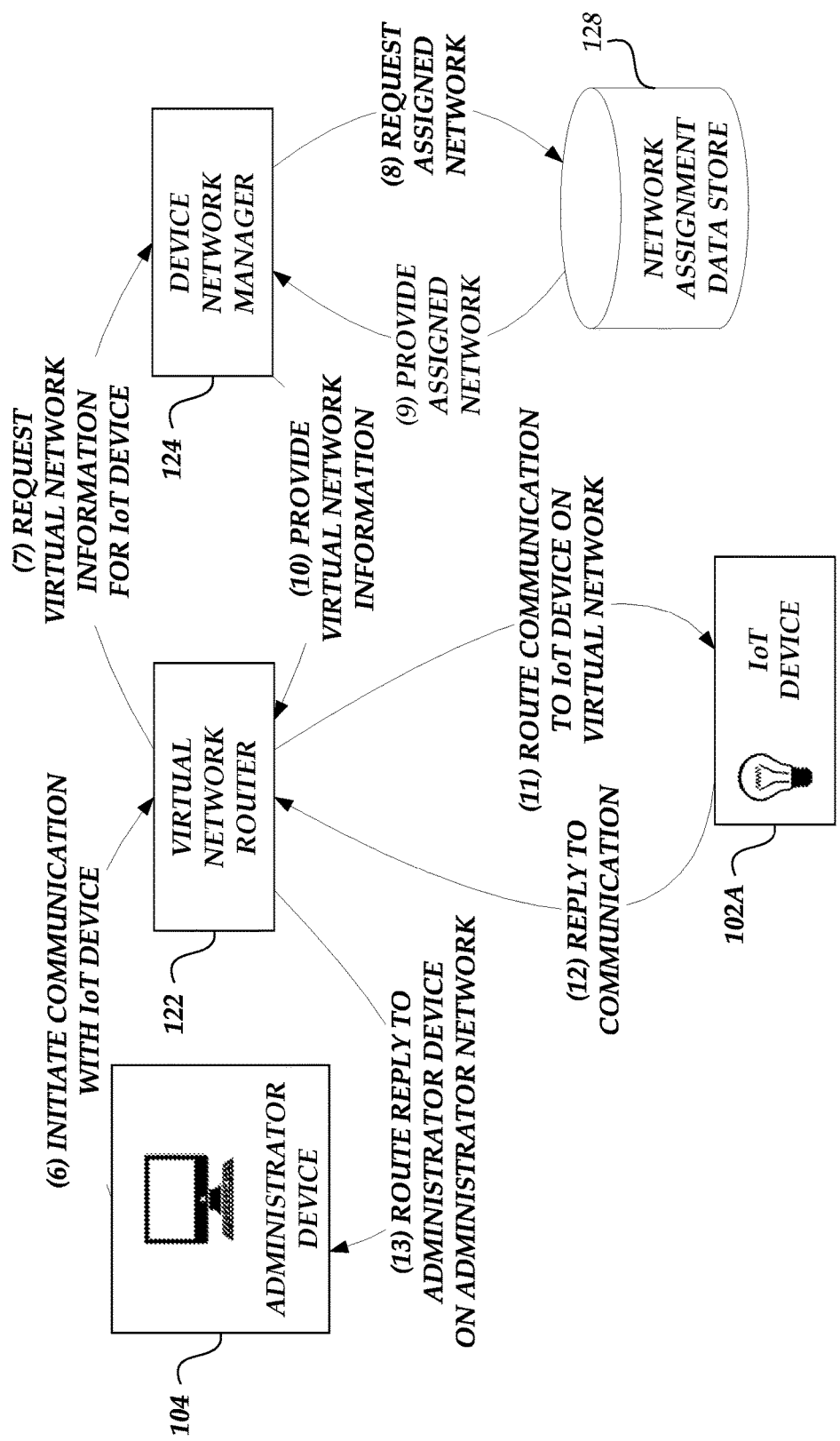
Figure 3D:
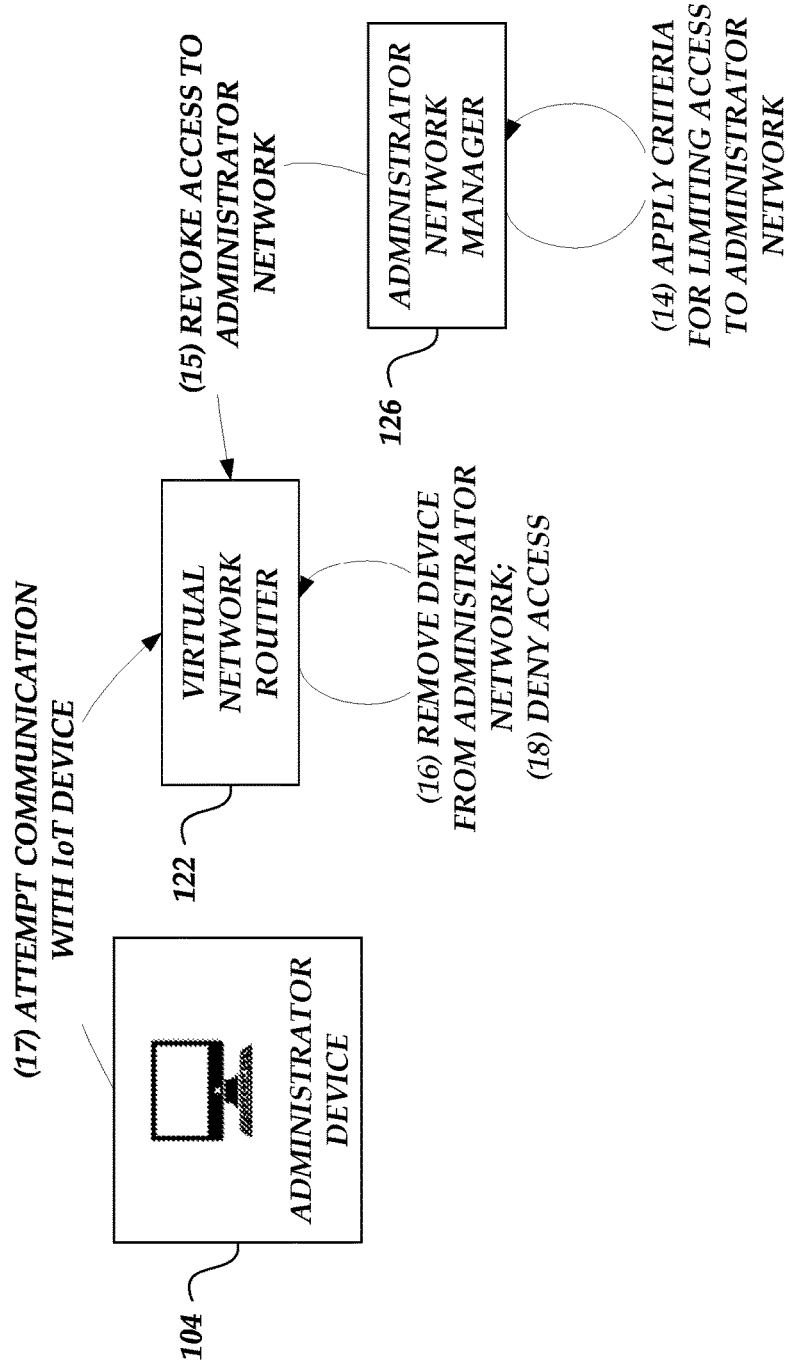

Turning now to FIGS. 3B-3D, example interactions for granting an administrator device access to isolated IoT devices will be described. With reference to FIG. 3B, at (1), an administrator device 104 may request access to a device, such as IoT device 102A. In some embodiments, an administrator device 104 may request access to a category of devices. For example, a "hub" device made by a particular supplier may request access to all network-enabled light bulbs from the same supplier, or an application on a mobile computing device may request access to video feeds from all network-enabled home security cameras. In other embodiments, the administrator device 104 may request access to a particular virtual network or networks.

In some embodiments, the administrator device 104 may request access to a device or a virtual network by requesting access to an administrator network (e.g., the administrator network 114 depicted in FIG. 1). Illustratively, the administrator network may be a network implemented by the virtual network router 122 that provides "one-way" visibility and access to devices on virtual networks. For example, the virtual network router 122 may present the IoT device 102A as a device on the administrator network, and may transparently handle communications between the administrator device 104 to the IoT device 102A by routing them via the assigned virtual network. In such embodiments, the IoT device 102A and the administrator device 104 are both unaware that the other device perceives the network differently: The IoT device 102A behaves as though it were communicating with a device on another network, the administrator device 104 behaves as though it were communicating with a device on the same network, and the virtual network router 122 performs the necessary actions to facilitate these communications.

In some embodiments, the administrator device 104 may authenticate itself as part of the request for access. For example, the administrator network may be implemented as a separate Wi-Fi network (e.g., with a different SSID) that requires a password to access, and the administrator device 104 may provide the password. As a further example, the administrator device 104 may present a security token or other credential to the virtual network router 122 to establish that it is authorized to access the device(s) or virtual network (s). In some embodiments, the virtual network router 122 may implement access controls, security levels, or other measures to secure access to various devices. For example, the virtual network router 122 may require two-factor authentication to access network-enabled security cameras, or may require a biometric scan to access a network-enabled deadbolt lock. In other embodiments, an administrator device 104 that is granted access to the administrator network can access any device on any virtual network.

At (2), the virtual network router 122 may request that the administrator network manager 126 grant the administrator device 104 access to the administrator network. The administrator network manager 126 may then, at (3), validate that the administrator device 104 is authorized to access the IoT device 102A. Illustratively, the administrator network manager 126 may verify the credentials or other information presented in the request. In some embodiments, the administrator network manager 126 may verify that the administrator device 104 is authorized to access the particular IoT device(s) to which it is requesting access. For example, in some embodiments the administrator network manager 126 may verify that the administrator device 104 is a controller or hub for a particular set of devices, and may validate that the administrator device 104 should have access to the administrator network and/or that set of devices.

In some embodiments, the administrator network manager 126 may determine that the requesting administrator device 104 is not authorized to access the administrator network. For example, the administrator device 104 may provide an incorrect password, invalid authentication token, or otherwise fail to validate. In such embodiments, the administrator network manager 126 may instruct the virtual network router 122 to deny access.

In embodiments where the administrator device 104 (or the request received from the administrator device 104) has been validated, at (4), the administrator network manager 126 instructs the virtual network router 122 to grant access to the administrator network. At (5), the virtual network router 122 grants the administrator device 104 access to the administrator network. In some embodiments, the virtual network router 122 may make requested devices visible or accessible on the administrator network as part of fulfilling the access request. In other embodiments, granting access to the administrator network may have the effect of granting access to all devices on all virtual networks. In further embodiments, the virtual network router 122 may create a virtual network on the administrator network, include requested devices in the administrator virtual network, and then instruct the administrator device 104 to join the administrator virtual network. Still further, in some embodiments, the virtual network router 122 may reconfigure the virtual network that includes the IoT device to also include the administrator device 104.

With reference now to FIG. 3C, at (6), the administrator device 104 may then initiate communications with the device for which access was requested, which in the illustrated embodiment is the IoT device 102A. In some embodiments, the virtual network router 122 may make the IoT device 102A accessible by creating an endpoint on the administrator network that, when accessed, routes communications to the IoT device 102A on its assigned virtual network (e.g., virtual network 112A of FIG. 1). In other embodiments, the virtual network router 122 may make the virtual network accessible to the administrator device 104 or the administrator network.

At (7), the virtual network router 122 may request information from the device network manager 124 to identify the virtual network associated with the IoT device 102A. At (8), the device network manager 124 may query the network assignment data store 128 for the assigned network, and at (9) the network assignment data store 128 may return the requested network assignment. At (10), the device network manager 124 may provide information identifying the virtual network associated with the IoT device 102A. In some embodiments, the virtual network router 122 may query the network assignment data store 128 directly (without going through the device network manager 124), and thus the interactions at (7) and (8) may be combined and the interactions at (9) and (10) may be combined.

At (11), the virtual network router 122 routes communications from the administrator device 104 on the administrator network to the IoT device 102 on the specified virtual network. Illustratively, as described above, the routing may be performed in a manner that is transparent to both devices. At (12) the IoT device 102 may reply to the communications from the administrator device 104, and at (13) the virtual network router 122 may route the reply to the administrator device 104 on the administrator network.

Although the terms "administrator device" and "administrator network" are used herein, it will be understood that the present disclosure is not limited to any particular reason or purpose for interacting with isolated devices. For example, the administrator device 104 may be a device that collects data from network-enabled motion sensors and determines whether to issue an "off" command to a network-enabled light (e.g., the IoT device 102A) or whether to adjust the temperature setting of a network-enabled thermostat. As a further example, the administrator device 104 may be a mobile computing device executing an application that accesses video feeds from network-enabled cameras. Accordingly, the administrator device 104 may, within the scope of the present disclosure, communicate with the IoT device 102A for any purpose.

Turning now to FIG. 3D, at (14), the administrator network manager 126 may apply criteria for limiting access to the administrator network. In various embodiments, as described above, the administrator network manager 126 may determine that the administrator device 104 has been on the administrator network for a threshold duration, that the administrator device 104 has been idle (e.g., that it has not communicated with any isolated device) for a threshold duration, that the administrator device 104 is attempting to access devices that it is not authorized to access, and so forth. In some embodiments, the administrator network manager 126 may determine that the administrator device 104 should be removed from the administrator network based on network activity associated with the administrator device 104. For example, the administrator network manager 126 may determine that the administrator device 104 is engaged in an unauthorized network activity, such as probing the IoT device 102A for security vulnerabilities or generating a threshold volume of network activity.

In some embodiments, the administrator network manager 126 determines, based on the criteria, that the administrator device 104's access to the administrator network should be revoked. In these embodiments, at (15), the administrator network manager 126 instructs the virtual network router 122 to remove the administrator device 104 from the administrator network, which it does at (16). Thereafter, if the administrator device 104 attempts at (17) to communicate with the IoT device 102A via the administrator network, then at (18) the virtual network router 122 denies the attempt. In some embodiments, the virtual network router 122 may allow the administrator device 104 to remain on the administrator network, but may remove the endpoint that allows the administrator device to access the IoT device 102A or may refuse to route communications to the virtual network associated with the IoT device 102A. Additionally, in some embodiments, the administrator device 104 may repeat the interaction at (1) to renew its request to access the IoT device 102A and resume communication.

It will be understood that the interactions described with reference to FIGS. 3A-3D are provided for purposes of example, and that many other interactions and variations are within the scope of the present disclosure. For example, the virtual network router 122 may query the network assignment data store 128 directly to determine whether a device has previously been assigned to a virtual network, and may request that the device network manager 124 create and assign a virtual network if not. As a further example, the administrator device 104 may request access to the administrator network itself rather than requesting access to a particular device or devices. FIG. 3 is thus understood to be illustrative and not limiting.

Figure 4:
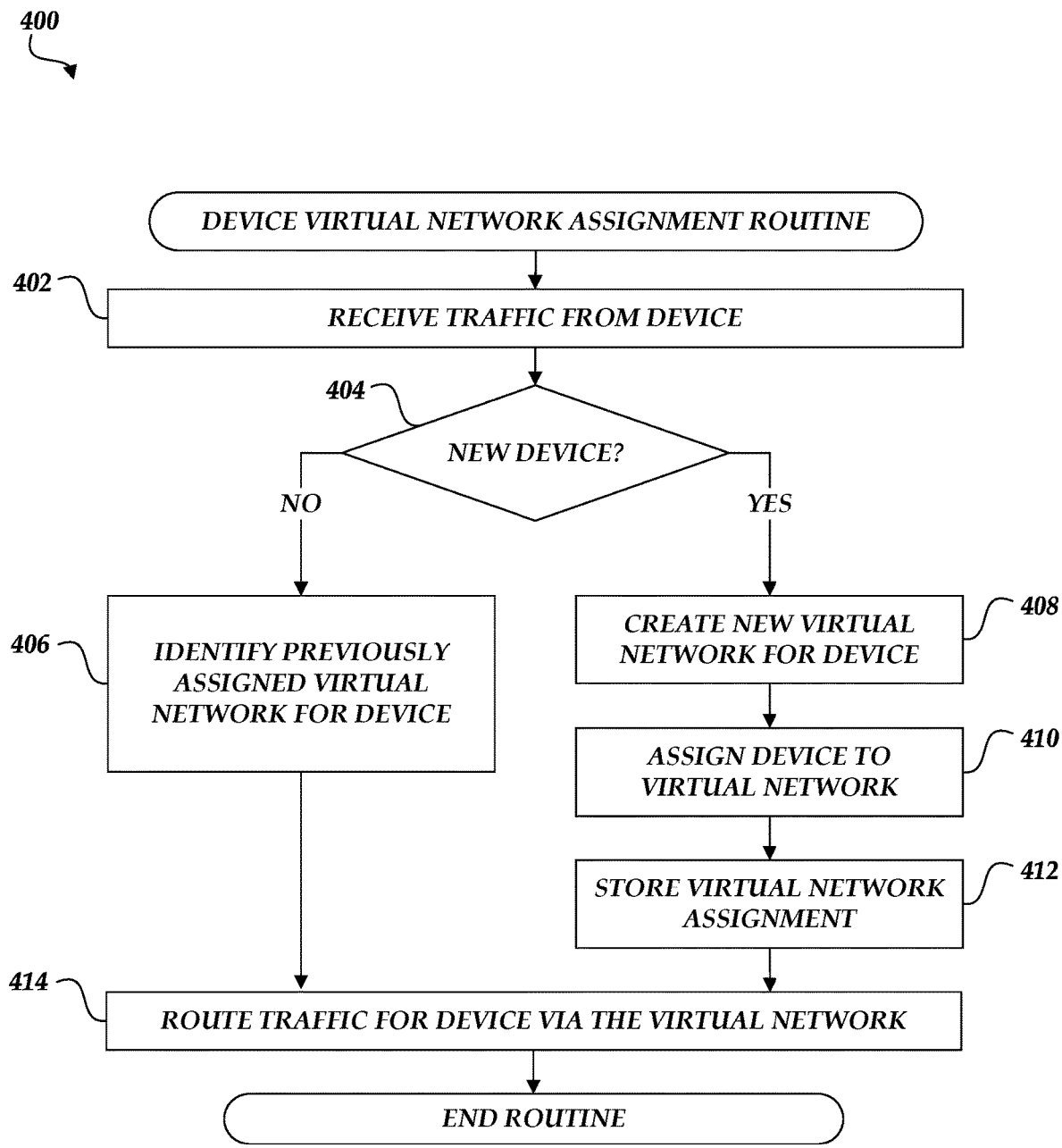
FIG. 4 is a flow chart depicting an illustrative routine for assigning a device to a virtual network and routing network traffic to the device in accordance with aspects of the present disclosure.

FIG. 4 is a flow diagram depicting an example routine 400 for assigning virtual networks to devices. The routine 400 may be carried out, for example, by the device network manager 124 depicted in FIG. 1. At block 402, network traffic may be received from a device. In some embodiments, the network traffic may be received via a network that has been designated as a network for potentially insecure devices. For example, the device network 110 depicted in FIG. 1 may be designated as such a network. In some embodiments, a device may explicitly request that a virtual network be created, or may request that it be assigned to a virtual network. For example, a "smart speaker" virtual assistant device may request that it be assigned to a virtual network with other virtual assistant devices if one exists, or that a new virtual network be created and designated as the preferred virtual network for virtual assistant devices if not.

At decision block 404, a determination may be made as to whether to assign the device to an existing virtual network or a new virtual network. In some embodiments, the determination may be made based on the network traffic. For example, the determination may be that the network traffic represents the device joining the network or registering on the network. In other embodiments, the determination may be made based on metadata included in the network traffic, such as a device identifier (e.g., a MAC address or UUID) or a previously unused originating address. In still further embodiments, the determination may be made based on whether the network traffic is already tagged with a virtual network tag (e.g., a VLAN tag). In some embodiments, the determination may be based on a device type or categorization. For example, the determination may be that the device belongs to a particular category and should be added to an existing virtual network associated with the category. As a further example, the determination may be that the device is of a type that should have its own virtual network (apart from other devices of the same type).

If the determination at decision block 404 is to assign the device to an existing virtual network, then the routine 400 branches to block 406, where the previously assigned virtual network may be identified. In some embodiments, the previously assigned virtual network may be identified by analyzing the network traffic. For example, a VLAN tag may be extracted from the network traffic and used to identify the virtual network. In other embodiments, the virtual network may be identified by looking up a device identifier in a table or data store, such as the network assignment data store 128. At block 414, the traffic received from the device may be routed via the identified virtual network.

If the determination at decision block 404 is to assign the device to a new virtual network, then at block 408 a new virtual network may be created. In some embodiments, virtual networks may be "leased" in a manner similar to the leasing of IP addresses under the DHCP protocol, and the determination at decision block 404 may be that the device's lease on a previous virtual network has expired, or that the device has not communicated via the assigned virtual network for a threshold duration. In other embodiments, virtual network assignments may be stored in a data store that has limited capacity, and may "age out" of the data store as newer assignments are made.

At block 410, the device may be assigned to the newly created virtual network. Illustratively, the device may be assigned to the virtual network by instructing the device to join the virtual network, instructing a router to route traffic associated with the device via the virtual network, modifying headers or other metadata associated with the traffic, or by any other approach that puts the device on the specified virtual network. At block 412, the virtual network assignment may be stored (e.g., in the network assignment data store 128) for later retrieval in future executions of the routine 400. At block 414, the traffic received from the device may be routed via the newly created virtual network.

It will be understood that device virtual network assignment routine 400 depicted in FIG. 4 is provided for purposes of example, and that many variations on the routine 400 are within the scope of the present disclosure. For example, blocks 410 and 412 may be combined, carried out in either order, or carried out in parallel. As a further example, the determination at decision block 404 may be as to whether the traffic has been received via a virtual network, rather than being a determination of whether the device has previously been encountered and assigned a virtual network. The routine 400 is thus understood to be illustrative and not limiting.

Figure 5:
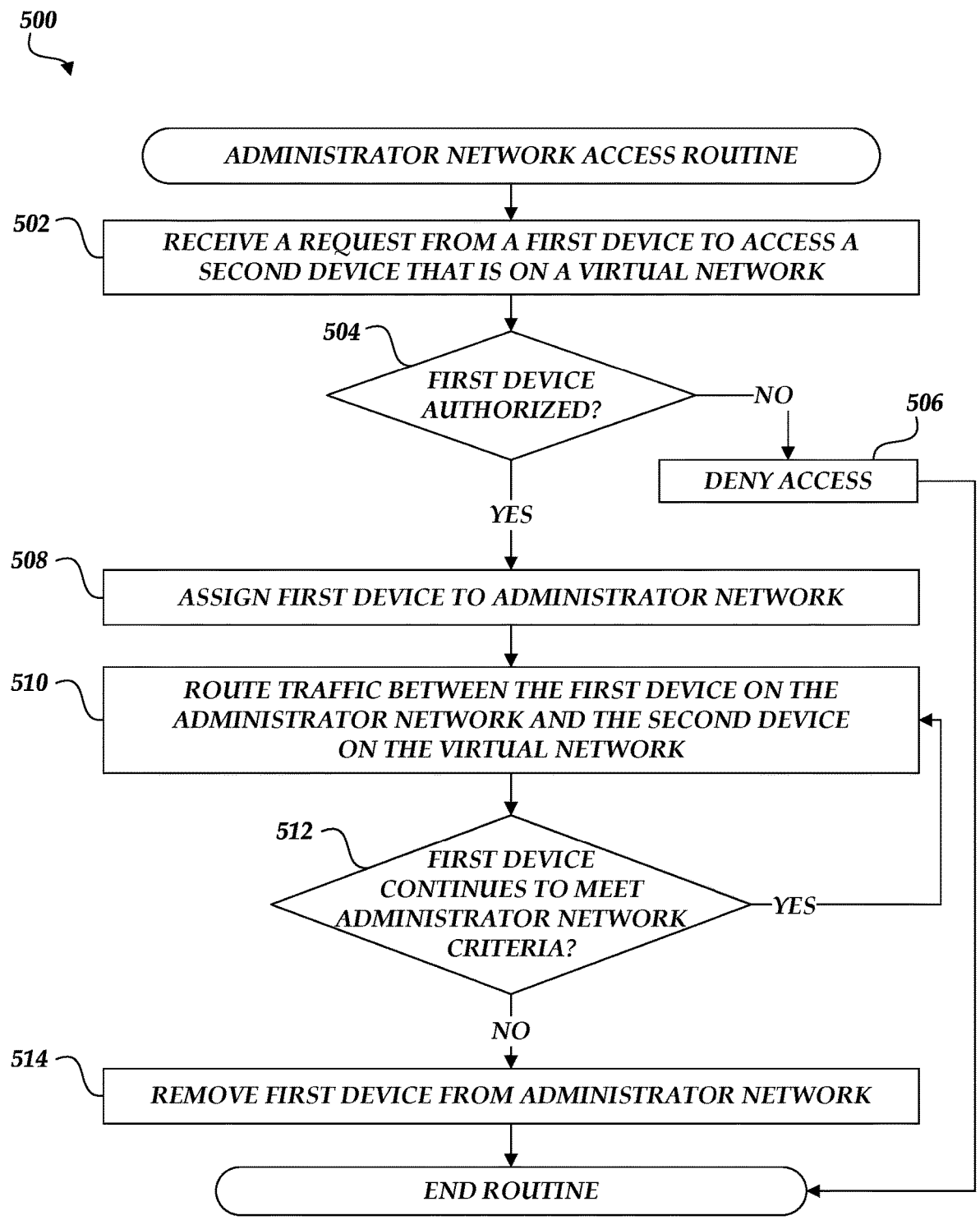
FIG. 5 is a flow chart depicting an illustrative routine for granting and revoking administrative access to an isolated device, and for routing traffic between an administrator device and the isolated device, in accordance with aspects of the present disclosure.

FIG. 5 is a flow diagram depicting an illustrative administrator network access routine 500. The routine 500 may be carried out, for example, by the administrator network manager 126 depicted in FIG. 1. At block 502, a request may be received from a first device (e.g., an administrator device 104) to access a second device (e.g., an IoT device 102) that is on a virtual network. In some embodiments, the request may be implicit. For example, the first device may attempt to communicate with the second device without explicitly requesting access to the second device, and the attempt may be treated as an access request. In some embodiments, as described above, the request to access the second device may include authentication information that can be used to verify whether the first device is authorized to access the second device.

At decision block 504, in some embodiments, a determination may be made as to whether the first device is authorized to access the second device. In some embodiments, the determination may be as to whether the first device is authorized to access an administrator network that provides access to the second device. In further embodiments, the request at block 502 may be received via the administrator network, and the receipt of communications via the administrator network may sufficiently establish that the first device is authorized to access to the administrator network. The determination at decision block 504 may therefore be omitted and the routine 500 may proceed directly to block 508 or block 510. In other embodiments, the request at block 502 may be a request to join the administrator network, and the determination at decision block 504 may be as to whether the first device has presented valid credentials for accessing the administrator network.

If the determination at decision block 504 is that the first device is not authorized to access the second device or the administrator network, then at block 506 access to the second device is denied, and the routine 500 ends. If, however, the determination at decision block 504 is that the first device is authorized to access the second device, then at block 508 the first device is assigned or granted access to the administrator network. In some embodiments, as described above, the second device may be added to the administrator network or made accessible from the administrator network.

At block 510, traffic between the first device and the second device may be routed between the administrator network and the second device's virtual network. In some embodiments, the first device may be limited to communicating with the second device, and attempts to communicate with other devices may be denied. At decision block 512, a determination may be made as to whether the first device continues to meet criteria for remaining on the administrator network. As described above, criteria may be applied to the first device that limit, e.g., the amount of time it spends on the administrator network, the amount of data it transmits or received, the number of devices it accesses, the number of virtual networks it accesses, the network activities that it may perform, or other criteria. If the determination is that the first device continues to meet the criteria, then the routine 500 branches to block 510 and continues routing traffic between the first device and the second device.

If the determination at decision block 512 is that the first device no longer meets the criteria for remaining on the administrator network, then at block 514 the first device may be removed from the administrator network. In some embodiments, as described above, the first device may remain on the administrator network but the second device may no longer be accessible. In various embodiments, as described above, further requests from the first device to access the second device may be denied, treated as renewed requests to access the administrator network or the second device, throttled or otherwise rate-limited, or subjected to other routing or treatment.

It will be understood that administrator network access routine 500 depicted in FIG. 5 is provided for purposes of example, and that many variations on the routine 500 are within the scope of the present disclosure. For example, block 508 may be omitted in embodiments where the first device is already on the administrator network, or decision block 512 may precede block 510. The routine 500 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claims:

1. A system comprising:
   a data store configured to store virtual network assignments; and
   a network router in communication with the data store, the network router comprising a processor configured with computer-executable instructions to perform operations including:
      receiving, from a first computing device on a first network, a first request to initiate network communications;
      in response to receiving the first request from the first computing device, determining, based at least in part on a virtual network assignment criterion, to assign the first computing device to a first virtual network;
      creating the first virtual network for the first computing device, wherein the first virtual network is created on the first network, and wherein the first computing device is the only device on the first virtual network;
      assigning the first computing device to the first virtual network;
      routing network communications with the first computing device via the first virtual network;
      receiving, from a second computing device on the first network, a second request to initiate network communications;
      in response to receiving the second request from the second computing device, determining, based on the virtual network assignment criterion, to assign the second computing device to a second virtual network;
      creating the second virtual network for the second computing device, wherein the second virtual network is created on the first network, and wherein the second computing device is the only device on the second virtual network;
      assigning the second computing device to the second virtual network; and
      routing network communications with the second computing device via the second virtual network.

2. The system of claim 1, wherein the first virtual network comprises an Internet Protocol version 4 ("IPv4") network with a 32-bit subnet mask.

3. The system of claim 1, wherein the operations further include determining that the first computing device has not previously been assigned to a virtual network.

4. The system of claim 1, wherein the operations further include:
   receiving, from an administrator computing device, a third request to communicate with the first computing device via a second network;
   determining that the administrator computing device is authorized to access the first computing device;
   granting the administrator computing device access to the second network; and
   routing communications between the administrator computing device on the second network and the first computing device on the first virtual network.

5. The system of claim 4, wherein the third request to communicate with the first computing device via the second network comprises a request to access the second network.

6. A computer-implemented method comprising:
   receiving, by a network router, a request from a first computing device on a first network to initiate network communications;
   identifying, by the network router, a first virtual network based at least in part on applying a virtual network assignment criterion to the request from the first computing device;
   assigning, by the network router, the first computing device to the first virtual network, wherein the first virtual network isolates the first computing device from at least one other computing device;
   routing, by the network router, network communications with the first computing device via the first virtual network;
   receiving, by the network router, a request from a second computing device on the first network to initiate network communications;
   in response to receiving the request from the second computing device, identifying, by the network router, a second virtual network based at least in part on applying the virtual network assignment criterion to the request from the second computing device;
   creating, by the network router, the second virtual network;
   assigning, by the network router, the second computing device to the second virtual network, wherein the second virtual network isolates the second computing device from the first computing device and at least one other computing device;
   routing, by the network router, network communications with the second computing device via the second virtual network.

7. The computer-implemented method of claim 6 further comprising
   receiving, by the network router, a request from a third computing device on a second network to access the first computing device; and
   routing, by the network router, network communications between the third computing device on the second network and the first computing device on the first virtual network.

8. The computer-implemented method of claim 6 further comprising creating the first virtual network in response to the request from the first computing device.

9. The computer-implemented method of claim 6, wherein the first virtual network is an existing virtual network.

10. The computer-implemented method of claim 6, wherein the at least one other computing device is on a third virtual network.

11. The computer-implemented method of claim 6 further comprising:
   receiving, from a third computing device on the first network, a request to initiate network communications;
   determining that the third computing device is associated with a category of networked computing devices;
   determining that the first computing device is associated with the category of networked computing devices; and
   assigning the third computing device to the first virtual network.

12. The computer-implemented method of claim 6 further comprising analyzing network communications with the first computing device to identify a first pattern.

13. The computer-implemented method of claim 7 further comprising:
- receiving, by the network router, a request from the third computing device to access the second computing device; and
- denying the request to access the second computing device.

14. The computer-implemented method of claim 9, wherein the virtual network assignment criterion specifies one or more of a category of the first computing device, a type of the first computing device, network traffic generated by the first computing device, or that the first computing device has not previously been assigned to a virtual network.

15. The computer-implemented method of claim 11, wherein the category of networked computing devices comprises one or more of security devices, virtual assistant devices, lighting devices, content presentation devices, or appliances.

16. The computer-implemented method of claim 12, wherein the first pattern comprises one or more of: network communications with an identified set of servers, bandwidth utilization within an identified range, or periodic network communications.

17. The computer-implemented method of claim 12 further comprising:
- analyzing further network communications with the first computing device to identify a deviation from the first pattern; and
- notifying a user of the deviation from the first pattern.

18. A non-transitory computer-readable medium including computer-executable instructions that, when executed by a computing device, cause the computing device to perform operations including:
- receiving a request from a first computing device to initiate network communications;
- assigning the first computing device to a first virtual network based at least in part on a virtual network assignment criterion;
- routing network communications with the first computing device via the first virtual network, wherein the first virtual network isolates the first computing device from at least one other computing device;
- receiving a request from a second computing device to initiate network communications; and
- routing network communications with the second computing device via a second virtual network, wherein the second virtual network isolates the second computing device from at least one other computing device, and wherein the second virtual network is created in response to the request from the second computing device to initiate network communications.

19. The non-transitory computer-readable medium of claim 18, wherein the operations further include:
- receiving a request from the second computing device to access the first computing device; and
- routing network communications between the second computing device on a second network and the first computing device on the first virtual network.

20. The non-transitory computer-readable medium of claim 18, wherein the first virtual network is implemented on a first network.

21. The non-transitory computer-readable medium of claim 18, wherein the second computing device comprises an administrator device associated with the first computing device.

22. The non-transitory computer-readable medium of claim 19, wherein the operations further include:
- determining that the second computing device no longer satisfies an administrator network access criterion for accessing the first computing device; and
- in response to the determination, ceasing to route network communications between the second computing device and the first computing device.

23. The non-transitory computer-readable medium of claim 20, wherein the request from the first computing device to initiate network communications comprises joining the first network.

24. The non-transitory computer-readable medium of claim 22, wherein the administrator network access criterion comprises one or more of a time limit, bandwidth limit, network utilization limit, threshold number of devices accessed, threshold amount of idle time, or authorized set of network activities.

* * * * *